(12) United States Patent
Arnold et al.

(10) Patent No.: US 10,589,971 B2
(45) Date of Patent: Mar. 17, 2020

(54) WORKING PLATFORM FOR A TRACTOR

(71) Applicant: Richard Arnold, Peru, NY (US)

(72) Inventors: Richard Arnold, Peru, NY (US); Nicholas Arnold, Peru, NY (US)

( * ) Notice: Subject to any disclaimer, the term of this patent is extended or adjusted under 35 U.S.C. 154(b) by 0 days.

(21) Appl. No.: 15/763,874

(22) PCT Filed: Dec. 15, 2017

(86) PCT No.: PCT/US2017/066627
§ 371 (c)(1),
(2) Date: Mar. 28, 2018

(87) PCT Pub. No.: WO2018/112319
PCT Pub. Date: Jun. 21, 2018

(65) Prior Publication Data
US 2019/0292031 A1    Sep. 26, 2019

Related U.S. Application Data

(60) Provisional application No. 62/434,520, filed on Dec. 15, 2016.

(51) Int. Cl.
*B66F 11/04* (2006.01)
*A01D 46/20* (2006.01)
(Continued)

(52) U.S. Cl.
CPC .............. *B66F 11/04* (2013.01); *A01D 46/20* (2013.01); *B62D 5/04* (2013.01); *B62D 15/025* (2013.01); *B66F 17/006* (2013.01); *G05D 1/0278* (2013.01); *A01B 51/00* (2013.01); *A01B 73/00* (2013.01); *A01G 3/08* (2013.01)

(58) Field of Classification Search
CPC ........ B66F 11/04; B66F 17/006; A01D 46/20; B62D 5/04; B62D 15/025; G05D 1/0278
See application file for complete search history.

(56) References Cited

U.S. PATENT DOCUMENTS 2,369,154 A * 2/1945 Chrenleigh ........... A01M 15/00
   47/1.44
2,614,893 A * 10/1952 Dearborn ............... A01D 46/20
   182/131
(Continued)

OTHER PUBLICATIONS

Copenheaver, "International Search Report", dated Feb 26, 2018 ISR for PCT/US/17?66627, Feb. 26, 2018.

*Primary Examiner* — Colleen M Chavchavadze
*Assistant Examiner* — Candace L Bradford
(74) *Attorney, Agent, or Firm* — Shawn Gordon; Justin W. McCabe; Dunkiel Saunders Elliott Raubvogel & Hand, PLLC

(57) ABSTRACT

A working platform that can be removably attached to a front portion of a utility tractor is provided in which the platform is at least horizontally adjustable, is sized to allow a user to move about on the platform, and the tractor can be controlled by a user with controls located on the platform. In addition, an automatic steering system may be included that allows the tractor to remain generally along a preselected course, such as between rows of trees or other objects. As the tractor moves down the row of an orchard, the platform can be adjusted so as to be in an appropriate position for performing work on the tree.

4 Claims, 10 Drawing Sheets

(51) Int. Cl.
*B62D 5/04* (2006.01)
*B62D 15/02* (2006.01)
*B66F 17/00* (2006.01)
*G05D 1/02* (2020.01)
*A01G 3/08* (2006.01)
*A01B 51/00* (2006.01)
*A01B 73/00* (2006.01)

(56) References Cited

U.S. PATENT DOCUMENTS

| | | | |
|---|---|---|---|
| 3,096,848 A | | 7/1963 | Kazuo et al. |
| 3,191,704 A | * | 6/1965 | Sheiton .................. G01G 5/003 180/6.26 |
| 3,337,000 A | | 8/1967 | Gilaldi |
| 3,516,512 A | | 6/1970 | Kupke et al. |
| 3,534,832 A | | 10/1970 | Rediske |
| 3,690,092 A | | 9/1972 | Ross et al. |
| 3,866,713 A | | 2/1975 | Carpenter et al. |
| 4,172,352 A | | 10/1979 | McCarthy et al. |
| 4,690,246 A | * | 9/1987 | Homagold ............ B66F 11/046 182/131 |
| 4,888,941 A | | 12/1989 | Gerber |
| 5,064,338 A | | 11/1991 | Lawrence |
| 6,182,788 B1 | | 2/2001 | Senior |
| 2002/0011375 A1 | * | 1/2002 | Ishimori ................ A01B 71/06 180/298 |
| 2013/0292203 A1 | * | 11/2013 | Cummings ........... B66F 11/046 182/18 |
| 2014/0331629 A1 | | 11/2014 | Dagorret |
| 2018/0321682 A1 | * | 11/2018 | Matsumoto .......... G05D 1/0278 |
| 2018/0362312 A1 | * | 12/2018 | Beji ........................ B66F 9/20 |

* cited by examiner

US 10,589,971 B2

WORKING PLATFORM FOR A TRACTOR

RELATED APPLICATION DATA

This application is a national stage application of PCT Application No. PCT/US2017/066627, filed Dec. 15, 2017 and titled "Working Platform for a Tractor", which claims the benefit of priority of U.S. Provisional Application No. 62/434,520, filed Dec. 15, 2016, and titled "Working Platform for a Tractor," each of which is incorporated by reference herein in their entirety.

FIELD OF THE INVENTION

The present invention generally relates to accessories for tractors. In particular, the present invention is directed to a working platform for a utility tractor.

BACKGROUND

Orchards need to be regularly pruned in order to keep the trees in the proper condition for growing fruit (e.g., apples, peaches, etc.). Traditionally, pruning and trellis work was done on a ladder, which was laborious and very time consuming because workers had to climb down off the ladder to move from place to place within a tree and to progress from tree to tree. To cut down on the challenges of using ladders or other types of fixed scaffolding, certain elevated, mobile platforms were developed to increase pruning efficiency, such as the aerial platform apparatus disclosed in U.S. Pat. No. 3,866,713 to Carpenter et al. ("Carpenter"). However, these elevated, mobile platforms are dedicated pruning machines, which adds another piece of equipment to a farm or orchard thereby increasing costs and expense. Also, these mobile platforms have not been designed to allow for pruning of both sides of a row of trees simultaneously. Additionally, the apparatus disclosed in Carpenter requires both a pruner in the platform and an operator to move the platform to the next location. These failures make them impractical for many orchards and small farms. At least one device, shown in U.S. Pat. No. 3,534,832 to Rediske ("Rediske"), discloses a single extension boom with an aerial platform that is attached to a rear three-point hitch of a tractor that was intended for use in repairing and painting buildings with relatively high side walls. In the context of orchard maintenance, however, Rediske has several shortcomings, including: 1) significant chance of instability during use (a platform usable in orchards needs to be movable along the curvilinear path of the tree branches, which is not accounted for in Rediske's design), 2) inability to have two pruners on opposite sides of a row of trees, and 3) it includes a complex, integrated driving control system that is not readily removable from the tractor when the aerial platform is not needed.

What is needed are platforms designed for use in pruning, harvesting, and trellis work that are removably attached to opposing sides of the front half of standard utility tractors that can accommodate more than one worker, allow a worker to move about on the platform, allow a compressor or other device to be attached to the rear of the tractors so as to be available for powering pruning equipment, for example, and to allow the worker to adjust the location of the tractor from the platform and the position of the platform itself, so as to get closer to a tree in need of pruning, for example.

SUMMARY OF THE DISCLOSURE

In an exemplary embodiment, a working platform for a tractor having, along its longitudinal axis, a front, a middle, and a rear, is provided in which the working platform includes a first platform removably attached to the tractor on a first side of the tractor between the front and the middle of the tractor, wherein the platform is configured to be adjusted horizontally toward and away from the tractor and wherein the platform is sized to allow more than one worker to be on the platform. A control mechanism on the first platform is operably connected to steering, braking and gear shifting functions of the tractor so as to allow for driving of the tractor from the working platform.

Additionally or alternatively, the working platform may include a second platform that is removably attached to a second side of the tractor, the second side being opposite the first side. In this way, instability or imbalance of the tractor can be reduced and work may be performed on trees in two rows simultaneously.

Additionally or alternatively, the first platform and the second platform may be configured to be adjusted horizontally independently of each other with foot pedals located on each respective platform. In this way, workers may position their platforms appropriately for the shape and position of branches of the tree they are about to work on, and may, because of the foot control, be able to continue to grasp and use tools, such as pruning tools, while making adjustments to the horizontal position of the platform they are on.

Additionally or alternatively, the first platform and the second platform are not adjustable in a vertical direction. In this configuration, the platforms may be less expensive and easier to install.

Additionally or alternatively, the working platform may include an automatic steering system and the automatic steering system is engaged and disengaged by a switch located on the first platform. In this way, the tractor can be automatically guided down the rows while the workers continue to work uninterrupted.

Additionally or alternatively, the first platform is connected to the tractor by an arm and the arm is pivotable in a horizontal plane by a hydraulic cylinder such that the first platform is adjustable between a retracted position and an extended position on a single plane. In this way, the platform may be adjusted horizontally using power from the tractor.

Additionally or alternatively, the working platform may include an air compressor attached to the rear of the tractor via a three-point hitch. In this way, the air compressor may provide stabilizing counterweight in the back of the tractor and can be used to power tools used by workers on the platform.

Additionally or alternatively, a base of the first platform is about 5 feet above the ground when attached to the tractor. In this way, the platform is at a height that is convenient for work on the types of trees commonly found in orchards.

Additionally or alternatively, the control mechanism includes a motor, a wheel, and a band, wherein the band is operably wrapped around the wheel and a steering wheel of the tractor, and wherein the motor turns the wheel such that the steering wheel is controlled through control of the motor. In this way, steering of the tractor may be controlled from the working platform via a mechanism that can be easily installed and removed from the tractor without damaging the tractor.

Additionally or alternatively, the first platform includes a safety rail system. In this way, workers on the platform can reach out into the trees and have a reduced risk of falling from the platform.

Additionally or alternatively, the control mechanism includes a gear shift assembly, the gear shift assembly including a knob for changing gears that is operably connected to an actuator that is reversibly attached to a gear shift lever of the tractor. In this way, gear shifting may be controlled from the working platform via a mechanism that can be easily installed and removed from the tractor without damaging the tractor.

Additionally or alternatively, the automatic steering system includes a GPS device. In this way, a course may be set and followed prior to the commencement of work, which relieves workers on the platform from having to focus on steering the tractor while also working on the trees.

In another embodiment, a device for supporting workers on a tractor that can be removably attached to the tractor is provided that includes a frame mount attached to a frame of the tractor, a plurality of first vertical supports attached to the frame mount on a first side toward a front half of the tractor, and a plurality of second vertical supports attached to the frame mount on a second side toward the front half of the tractor, wherein the second side is opposite the first side. A first cross-bar member is attached to the plurality of first vertical supports and a second cross-bar member is attached to the plurality of second vertical supports. A first platform is attached to the first cross-bar member via a first hingeable arm, wherein the first platform can be adjusted horizontally toward and away from the first side of the tractor independently from the second platform by a user on the first platform, and a second platform is attached to the second cross-bar member via a second hingeable arm, wherein the second platform can be adjusted horizontally toward and away from the second side of the tractor independently from the first platform by a user on the second platform.

Additionally or alternatively, the first platform and the second platform are sized to allow more than one worker to be on each of the first platform and the second platform. In this way, a single utility tractor can carry at least four workers down a row of orchard trees at once.

Additionally or alternatively, the device includes an air compressor attached to a rear of the tractor via a three-point hitch. In this way, the air compressor may provide stabilizing counterweight in the back of the tractor and can be used to power tools used by workers on the platform.

Additionally or alternatively, the device may include a control mechanism on the first platform operably connected to steering, braking and gear shifting functions of the tractor, wherein the control mechanism includes a motor, a wheel, and a band, wherein the band is operably wrapped around the wheel and a steering wheel of the tractor, and wherein the motor turns the wheel such that the steering wheel is controlled through control of the motor. In this way, steering of the tractor may be controlled from the working platform via a mechanism that can be easily installed and removed from the tractor without damaging the tractor.

Additionally or alternatively, the first platform and the second platform each include a foot pedal for controlling horizontal positioning of the respective platform on which the foot pedal is located. In this way, workers may position their platforms appropriately for the shape and position of branches of the tree they are about to work on, and may, because of the foot control, be able to continue to grasp and use tools, such as pruning tools, while making adjustments to the horizontal position of the platform they are on.

Additionally or alternatively, the first platform and the second platform are not adjustable in a vertical direction. In this configuration, the platforms may be less expensive and easier to install on the tractor.

Additionally or alternatively, the device includes an automatic steering system, wherein the automatic steering system can be engaged and disengaged by a switch located on the first platform. In this way, the tractor can be automatically guided down the rows while the workers continue to work uninterrupted.

Additionally or alternatively, the automatic steering system includes a GPS device. In this way, a course may be set and followed prior to the commencement of work, which relieves workers on the platform from having to focus on steering the tractor while also working on the trees.

Additionally or alternatively, the first platform includes a safety rail system. In this way, workers on the platform can reach out into the trees and have a reduced risk of falling from the platform.

Additionally or alternatively, the control mechanism includes a gear shift assembly and the gear shift assembly includes a knob for changing gears that is operably connected to an actuator that is reversibly attached to a gear shift lever of the tractor. In this way, gear shifting may be controlled from the working platform via a mechanism that can be easily installed and removed from the tractor without damaging the tractor.

In another embodiment, a working platform includes a frame mount designed and configured to be removably attached to a frame of a tractor, a plurality of vertical supports attached to the frame mount, and a cross-bar member attached to the plurality of vertical supports. A decking is connected to the cross-bar member via a hingeable arm, wherein the decking includes a safety rail system and wherein the decking is configured to be adjusted horizontally by a hydraulic cylinder attached to the cross-bar member and configured to pivot the hingeable arm in response to a foot pedal control. A control mechanism is on the first platform and is designed and configured to be operably connected to steering, braking and gear shifting functions of the tractor.

Additionally or alternatively, the decking is not adjustable in a vertical direction. In this configuration, the platforms may be less expensive and easier to install.

Additionally or alternatively, the working platform includes an automatic steering system that includes a GPS device, wherein the automatic steering system is engaged and disengaged by a switch located on the decking. In this way, a course may be set and followed prior to the commencement of work, which relieves workers on the platform from having to focus on steering the tractor while also working on the trees.

Additionally or alternatively, the working platform includes an air compressor attached to the rear of the tractor via a three-point hitch. In this way, the air compressor may provide stabilizing counterweight in the back of the tractor and can be used to power tools used by workers on the platform.

Additionally or alternatively, the decking is about 5 feet above the ground when attached to the tractor. In this way, the platform is at a height that is convenient for work on the types of trees commonly found in orchards.

Additionally or alternatively, the control mechanism includes a motor, a wheel, and a band, wherein the band is operably wrapped around the wheel and a steering wheel of the tractor, and wherein the motor turns the wheel such that the steering wheel is controlled through control of the motor. In this way, steering of the tractor may be controlled from the working platform via a mechanism that can be easily installed and removed from the tractor without damaging the tractor.

Additionally or alternatively, the decking includes a safety rail system. In this way, workers on the platform can reach out into the trees and have a reduced risk of falling from the platform.

Additionally or alternatively, the control mechanism includes a gear shift assembly, the gear shift assembly including a knob for changing gears that is operably connected to an actuator that is reversibly attached to a gear shift lever of the tractor. In this way, gear shifting may be controlled from the working platform via a mechanism that can be easily installed and removed from the tractor without damaging the tractor.

In another embodiment, a method of performing work on trees includes attaching a first working platform to a first side of a tractor and attaching a second working platform to a second side of the tractor, the second side being opposite the first side. Then the tractor is positioned between a first row of trees and a second row of trees. A horizontal position of the first working platform is adjusted to account for a curvilinear shape of a tree in the first row proximate to the first working platform such that the first working platform is positioned for work to be performed on the tree in the first row by a worker on the first platform and a horizontal position of the second working platform is adjusted to account for a curvilinear shape of a tree in the second row proximate to the second working platform such that the second working platform is positioned for work to be performed on the tree in the second row by a worker on the second platform. Work is performed simultaneously on the tree in the first row and the tree in the second row, and then the tractor is moved forward between the first row of trees and the second row of trees. With the tractor in a new location between the rows, the horizontal position of the first working platform is readjusted such that the first working platform is positioned so that work can be performed on the first row of trees and the horizontal position of the second working platform is readjusted such that the second working platform is positioned so that work can be performed on the second row of trees.

In another embodiment, a method of pruning branches of trees in need thereof is provided which includes ascending an aerial platform that is attached to a utility tractor, driving the utility tractor, while in the aerial platform, proximate to a tree, and moving the aerial platform only in a horizontal plane away from the utility tractor so as to move the aerial platform proximate to ones of the branches. Ones of the branches are pruned and then the position of the aerial platform is altered only in the horizontal plane so as to move the aerial platform proximate to other ones of the branches.

Additionally or alternatively, the aerial platform is removably coupled to a side of the utility tractor. In this way, the utility tractor may be used for other purposes when the aerial platform is removed.

Additionally or alternatively, the method further includes removably coupling a second aerial platform to an opposite side of the utility tractor. In this way, any instability or imbalance of the utility tractor can be reduced and work may be performed on trees on both sides of the utility tractor at the same time.

Additionally or alternatively, the driving is facilitated by controls coupled to the steering wheel, brake pedal, and throttle, wherein no part of the controls are permanently installed on the utility tractor. In this way, the utility tractor may be used for other purposes when the aerial platform and controls are removed.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DESCRIPTION OF THE DISCLOSURE

The present invention is directed toward a working platform sized and configured to be removably attached to a front portion of a utility tractor. The platform can be moved toward and away from the side of the tractor to which it is attached in a horizontal plane so as to allow the user to move toward and away from an object to be worked on, such as the edge of a tree to be pruned. The working platform can be sized to allow a user to move about on the platform and allows the user to control the tractor's movement from the platform.

A working platform according to the present disclosure assists pruners (people involved in the act of pruning trees) to readily access the portions of the trees that need to be pruned efficiently and safely, as well as workers to perform other tasks on trees or, trellised plants. In certain embodiments, the working platform is removably attachable to a standard utility tractor so as to maintain the proper and safe operation of the tractor. The working platform can be moved in a horizontal plane away from and toward the side of the tractor (and therefore toward, or away from, the tree to be pruned). As trees have an outer edge that is somewhat curvilinear, this movement allows a pruner to get close to a tree as the tree's outer edge moves away from the tractor body (as the tractor moves slowly down a row). In certain embodiments, the working platform also includes the necessary controls to allow the pruner to operate the tractor from the working platform. In another embodiment, the working platform includes automatic controls that assist the tractor to remain substantially between the rows of trees while progressing slowly down the rows without assistance from the pruner. These and other aspects of the present invention are discussed in more detail below.

Figure 1A:
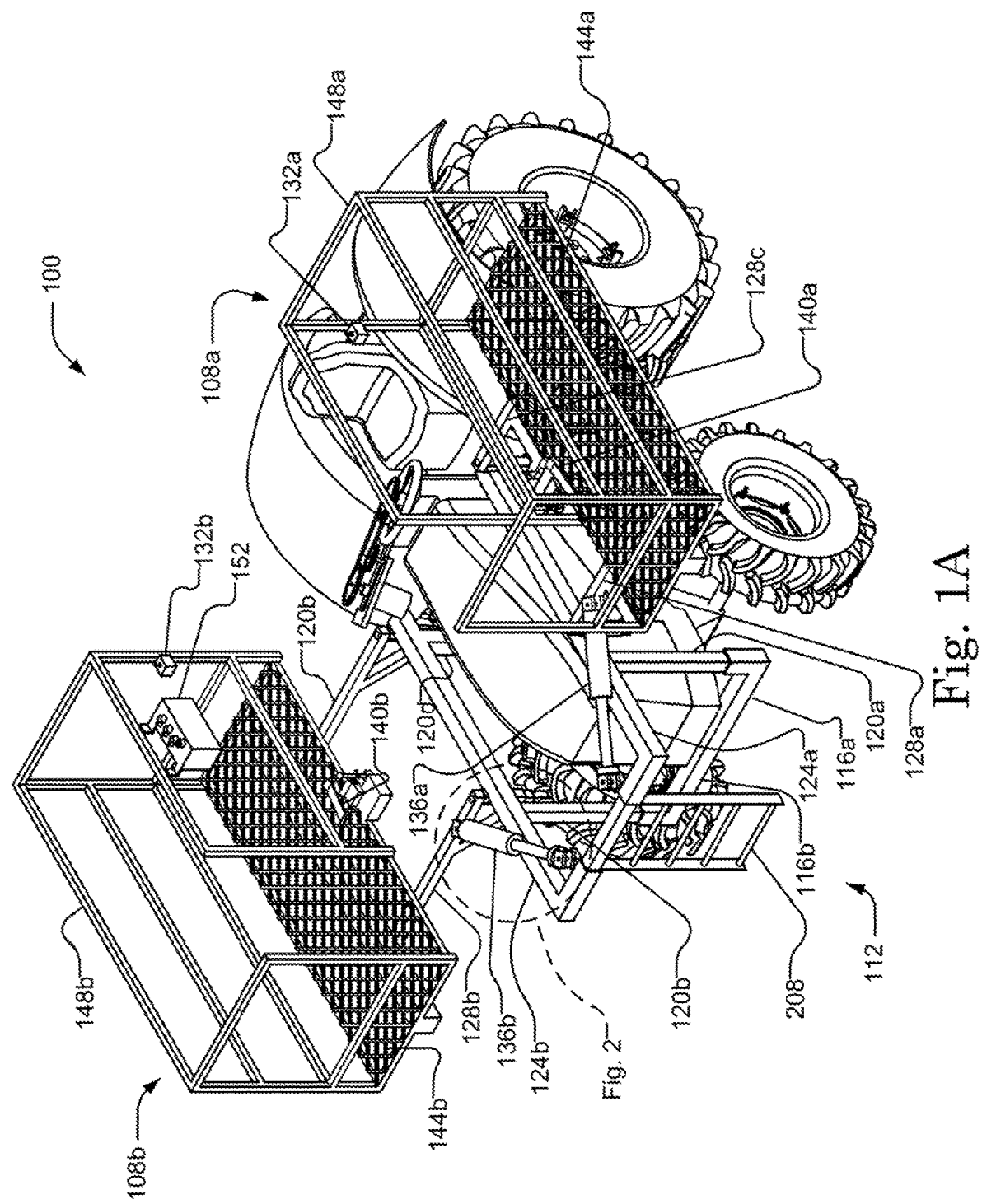
FIG. 1A is a perspective view of a tractor with attached working platforms in accordance with an embodiment of the present invention.
Figure 1B:
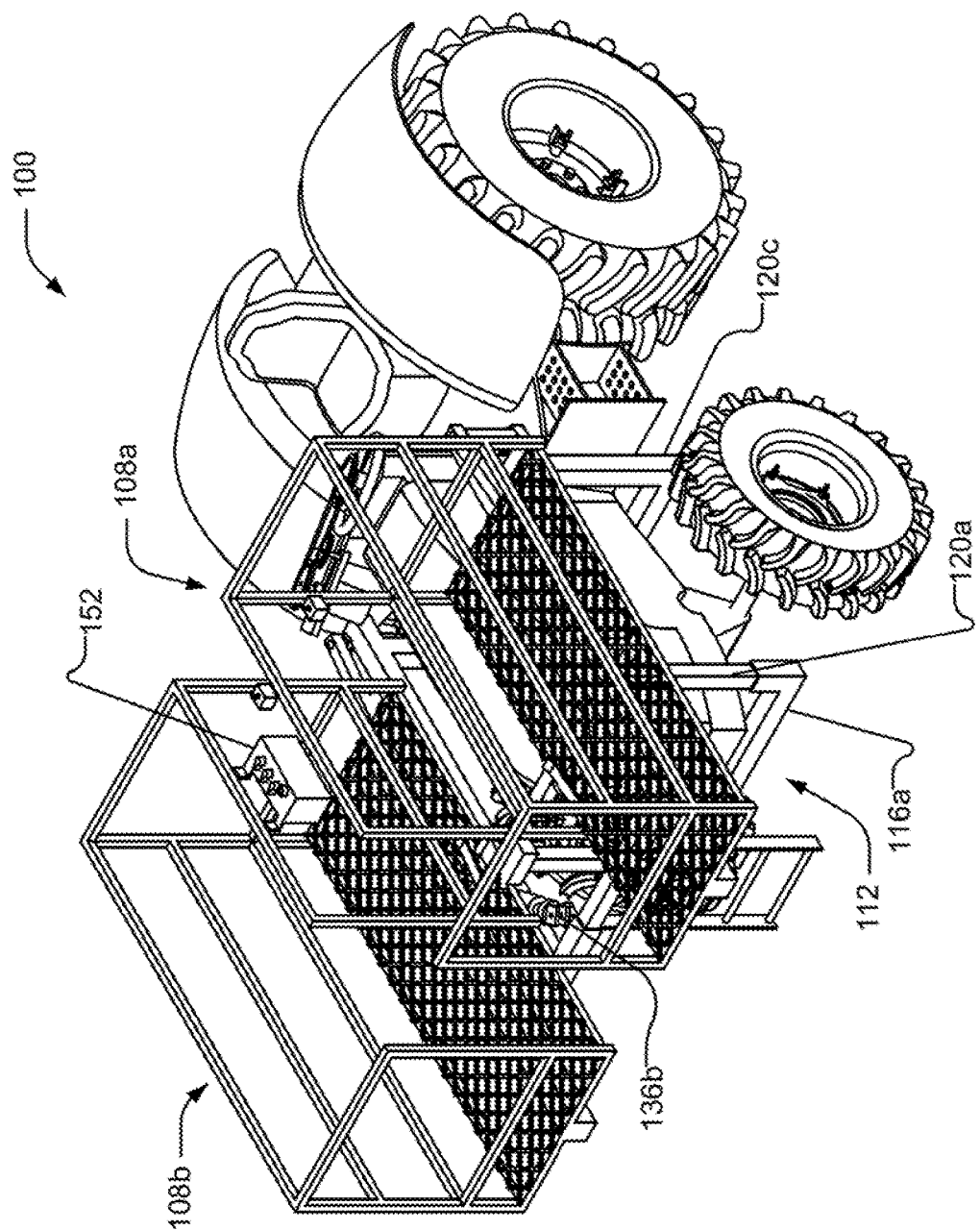
FIG. 1B is another perspective view of the tractor of FIG. 1A.
Figure 1C:
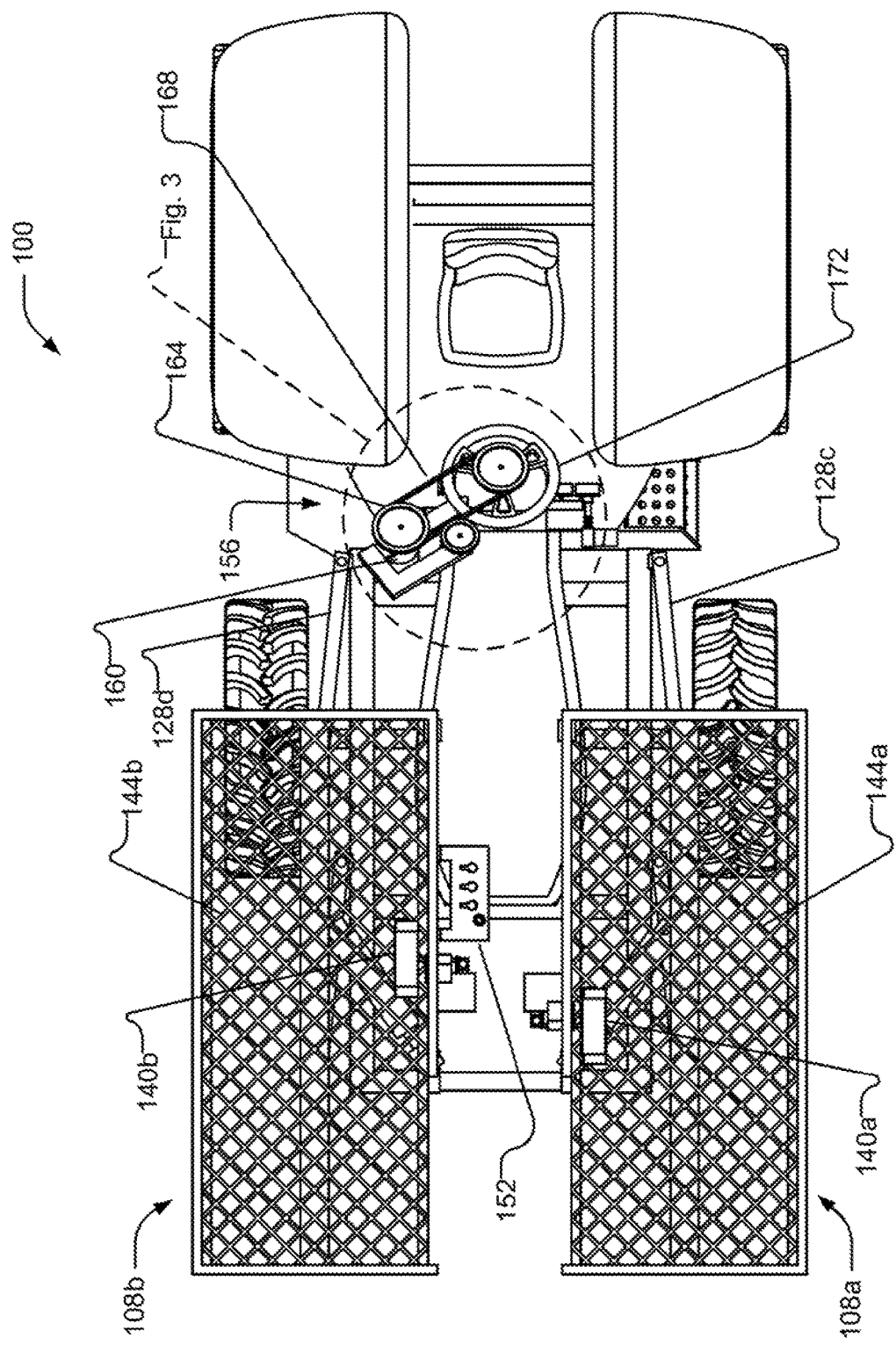
FIG. 1C is a top view of the tractor as shown in FIG. 1B.

Referring to FIGS. 1A-1C, a tractor 100 with an exemplary platform 108 (e.g., 108a and 108b) attached thereto is shown. In an exemplary embodiment, platform 108 can be used with a variety of utility tractors and can be removed from one tractor and attached to another tractor even if the tractors are not the same kind. In an exemplary embodiment, two platforms 108, platforms 108a and 108b, are removably attached to tractor 100. Platforms 108a and 108b are preferably attached to respective opposite sides of tractor 100 in order to help maintain balance in the event the platforms are exerting unbalanced forces (e.g., if one platform is fully extended and contains a worker while the second platform is empty and retracted). Preferably, platforms 108 are attached at about a middle-front portion of tractor 100. In this way, for many types of tractors, platform 108 would be generally attached approximately in line with the engine of the tractor with respect to a direction running from the front of the tractor to the back of the tractor, which further serves to help maintain balance. In addition, an air compressor (not shown) may be attached to the rear of the tractor (such as via a three-point hitch) as a counterweight if needed as well as for use for operating air-powered pruning equipment, for example.

Platform 108 may be attached to tractor 100 using any suitable technique. In an exemplary embodiment, platform 108 is attached to the tractor using a frame assembly 112. Frame assembly 112 includes frame mounts 116 (e.g., 116a-b), vertical supports 120 (e.g., 120a-d), cross-bar members 124 (e.g., 124a-b), and arms 128 (e.g., 128a-d). Frame mounts 116 are attached to the frame of tractor 100. Preferably, frame mounts 116 may be bolted or welded to the tractor frame. To each frame mount 116 a vertical support 120 is attached via bolts, for example. Vertical supports 120 may be of any desired length, but preferably of such length as to place platform 108 at an appropriate height, such as around five or six feet above the ground depending on the particular intended work to be done, when attached to tractor 100. Cross-bar members 124 are connected to vertical supports 120 on either side of the tractor 100. Cross-bar member connect platform 108 to vertical support 120.

Figure 2:
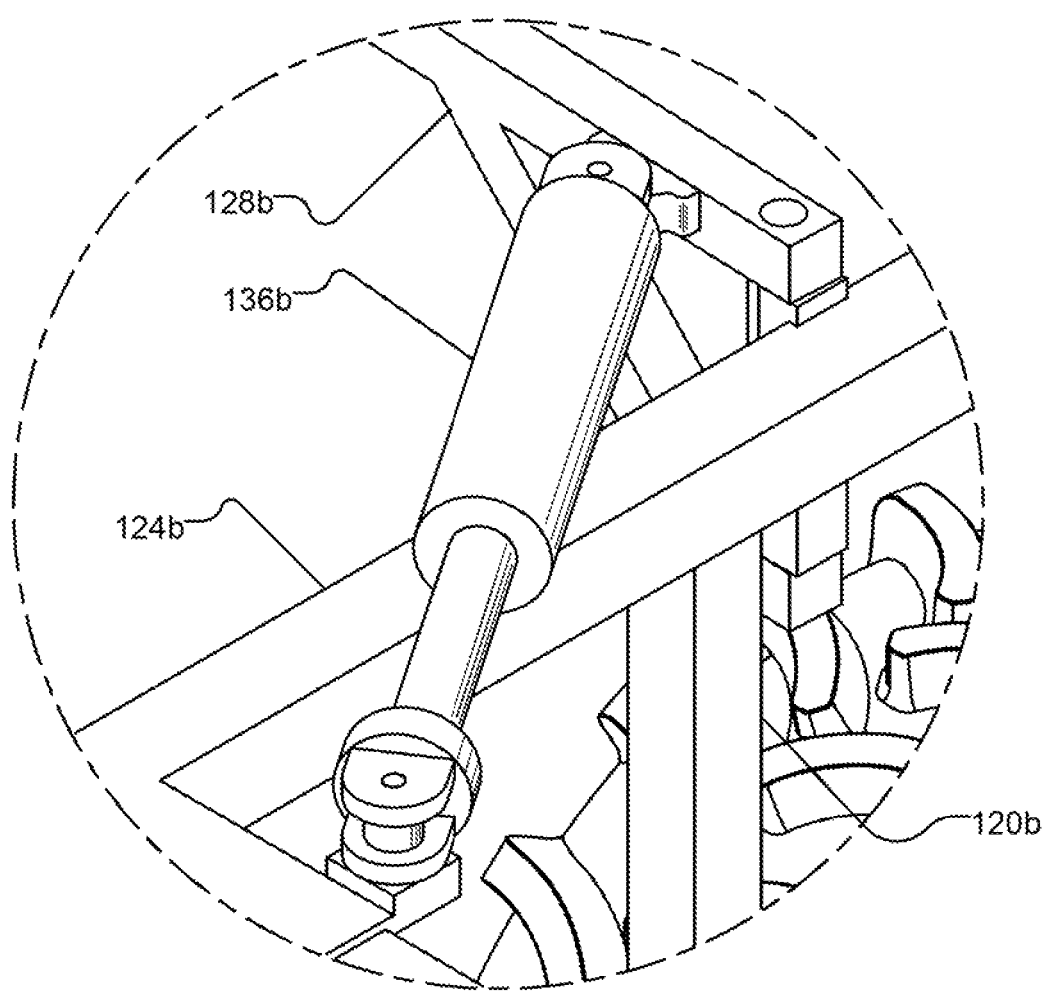
FIG. 2 is a detail view of a portion of FIG. 1A showing a hingeable arm and hydraulic cylinder.

Arms 128 are designed to support platform 108. Arms 128 may be pivotably attached to cross-bar members 124 and/or vertical supports 120. Arms 128 are pivotable in at least a horizontal plane and are preferably operably linked to a hydraulic cylinder 136 or other mechanism for moving arms 128 through the horizontal plane between a retracted position (platform 108a is shown in a retracted position in FIG. 1A) and an extended position (platform 108b is shown in an extended position in FIG. 1A). An end of hydraulic cylinder 136 may have a base on cross-bar member 124 and another end attached to arm 128, as can be seen in FIG. 2.

The pivoting action of arms 128 may be controlled by any suitable mechanism including a foot pedal 140 on platform 108 as shown in FIG. 1A, which can be connected to hydraulic cylinder 136 by hydraulic lines or other suitable operable connection. Pedal 140 allows a user to move platform 108 from the retracted position to the extended position while continuing to hold and use tools, such as pruning shears. If there are platforms on both sides of the tractor 100, each platform may be controlled separately from the other so that a worker on the right platform may, for example, have the right platform in the fully extended position while a worker on the left platform can have the left platform in the retracted position. In this way, in operation, the present invention allows work to be performed on two rows of trees, for example, while the tractor 100 moves down those rows.

Platform 108 may include decking 144 (e.g., 144a-b) or other suitable floor materials for supporting one or more workers as well as an appropriate railing system 148 (e.g., 148a-b). While each platform 108 may be any size depending on the tractor it is to be attached to and the intended work to be performed on it, about 1.5-3 feet wide and about 4-6 feet long may be preferable dimensions for attachment to typical utility tractors for use in pruning fruit trees, a size that allows a worker to move about on the platform to enable efficient work, e.g., on trees or trellises, or for there to be more than one worker on a platform.

Platform 108 may also include a control box 152 or similar for controlling functions of tractor 100, such as, but not limited to, steering, braking, on/off, forward/reverse, etc. Control box 152 may include knobs or switches that are operably connected to a brake assembly, a gear assembly, and a steering control for steering tractor 100. Each of these controls is reversibly interfaced with the tractor controls. For safety, each platform 108 is preferably equipped with a kill switch 132 (e.g., 132a-b).

Figure 3:
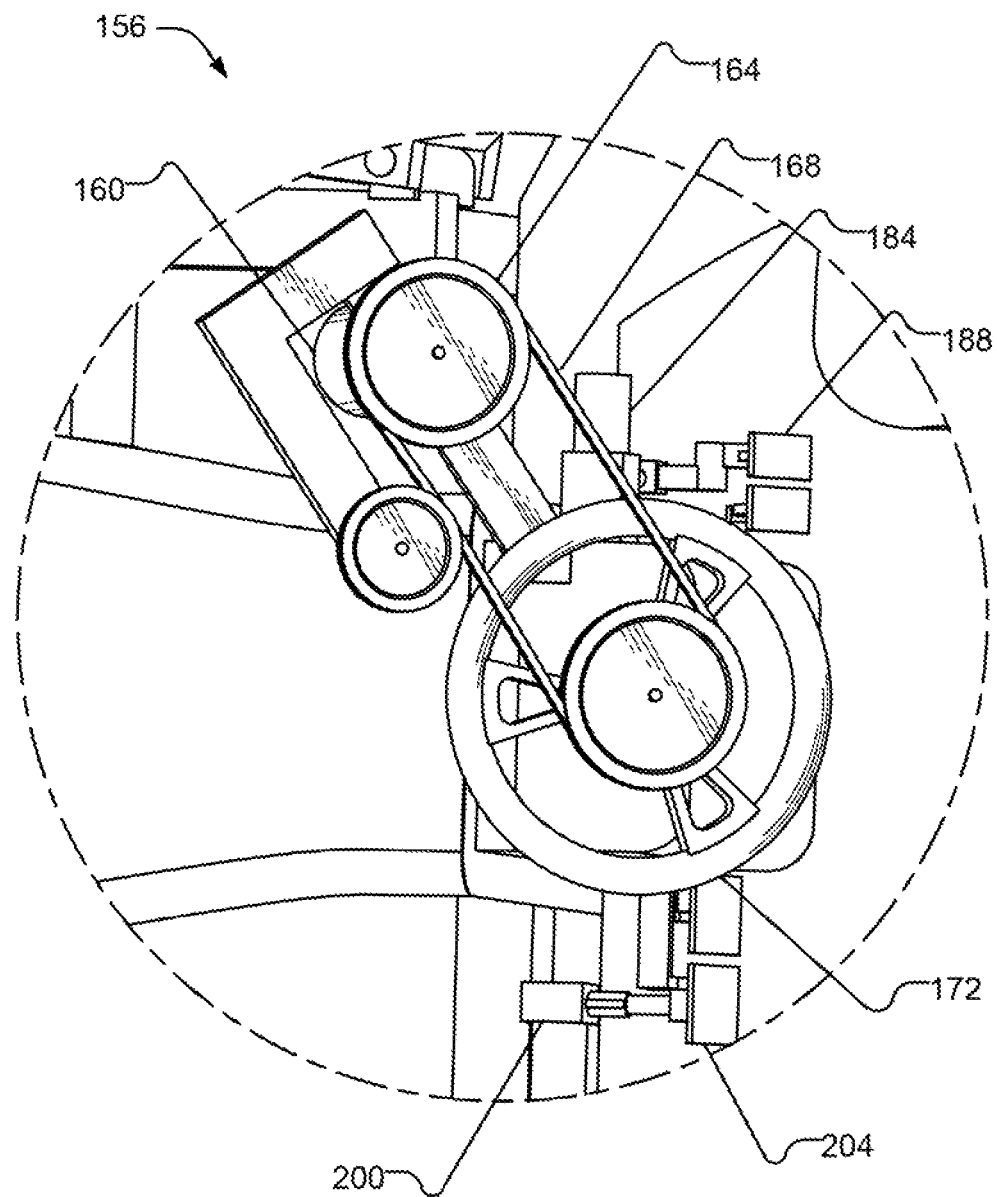
FIG. 3 is a detail view of a portion of FIG. 1C showing a portion of a tractor steering control mechanism.

FIG. 3 shows an exemplary embodiment of a steering control system 156. In this embodiment, steering control system 156 includes a motor 160, a wheel 164, and a band 168. Motor 160 is mounted on tractor 100 and connected to wheel 164. Band 168 wraps around wheel 164 and a steering wheel 172 of tractor 100. Connecting these components to control box 152 allows a user to steer tractor 100 while on remaining platform 108. When platform 108 is mounted to tractor 100 and is to be steered by a pruner, the pruner slips band 168 around wheel 164 and steering wheel 172 so as to allow for steering control of tractor 100. In another embodiment, band 168 may be connected to another wheel (not shown) that is rigidly connected to steering wheel 172.

Figure 4:
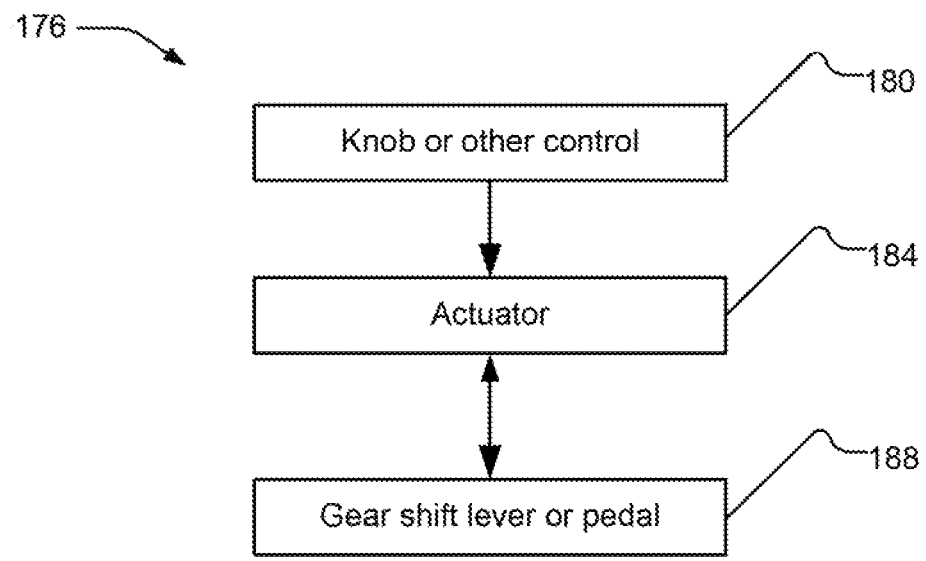
FIG. 4 is a schematic outline of a gear shift control mechanism of the present invention.

At a high level, and as outlined in FIG. 4, gear shift assembly 176 allows an operator to put tractor 100 into forward, reverse or neutral from platform 108. Gear shift assembly 176 includes a knob 180 or other mechanism for changing gears that is operably connected to an actuator 184 that is engaged with a gear shift lever 188. Actuator 184 may be reversibly attached to gear shift lever 188 via a cotter pin or other suitable mechanism depending on the type of gear shift lever. In operation, a pruner can change the operating gear of the tractor by moving knob 180 so as to change gears.

Figure 5:
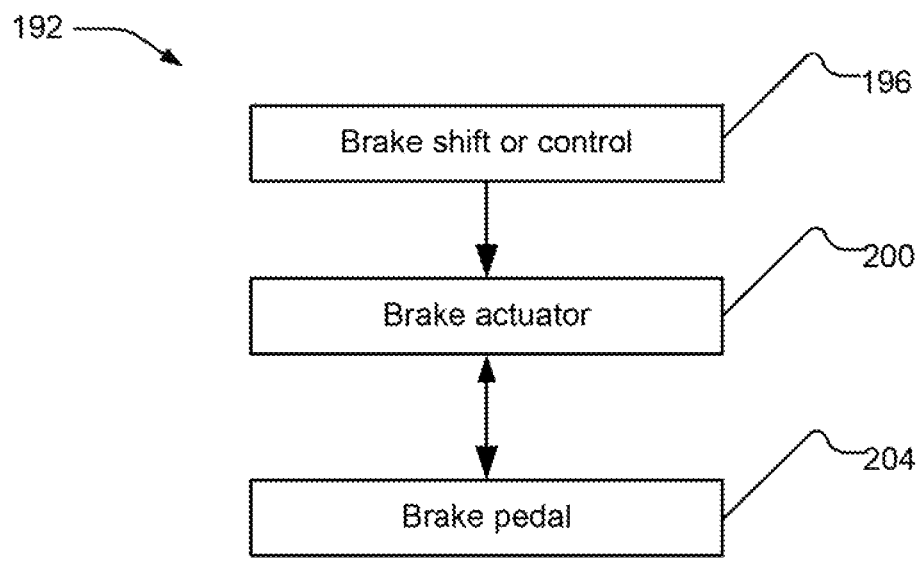
FIG. 5 is a schematic outline of a brake control mechanism of the present invention.

Brake assembly 192, as outlined in FIG. 5, includes a brake shift 196, which is operably connected to a brake actuator 200 that is engaged with a brake pedal 204 on tractor 100. Brake actuator 200 may be reversibly attached to brake pedal 204 via a cotter pin or other suitable mechanism. Brake actuator 200 may include a motor and an extendable shaft that when extended is operably connected to brake pedal 204 such that the brakes of tractor 100 are engaged.

A ladder 208 may be included to facilitate getting into platform 108. Ladder 208 may be attached near a front of the tractor 100 between platforms 108a and 108b and can be secured to, for example, vertical supports 120 and/or cross-bar members 124.

In an exemplary embodiment, tractor 100 can include an automatic steering system so that tractor 100 may be kept near the center of two rows of trees in an orchard, for example. The automatic steering assembly can make steering corrections to tractor 100 as the tractor moves along between the rows or so that the tractor maintains a predetermined route or directional heading. In an exemplary embodiment, automatic steering system may use a GPS to either guide the tractor along a predetermined route or maintain the tractor along a directional heading that is entered into the GPS (either a heading may be programmed or the system can determine the desired heading after a certain distance between rows has been travelled by the tractor while being manually steered).

Figure 6:
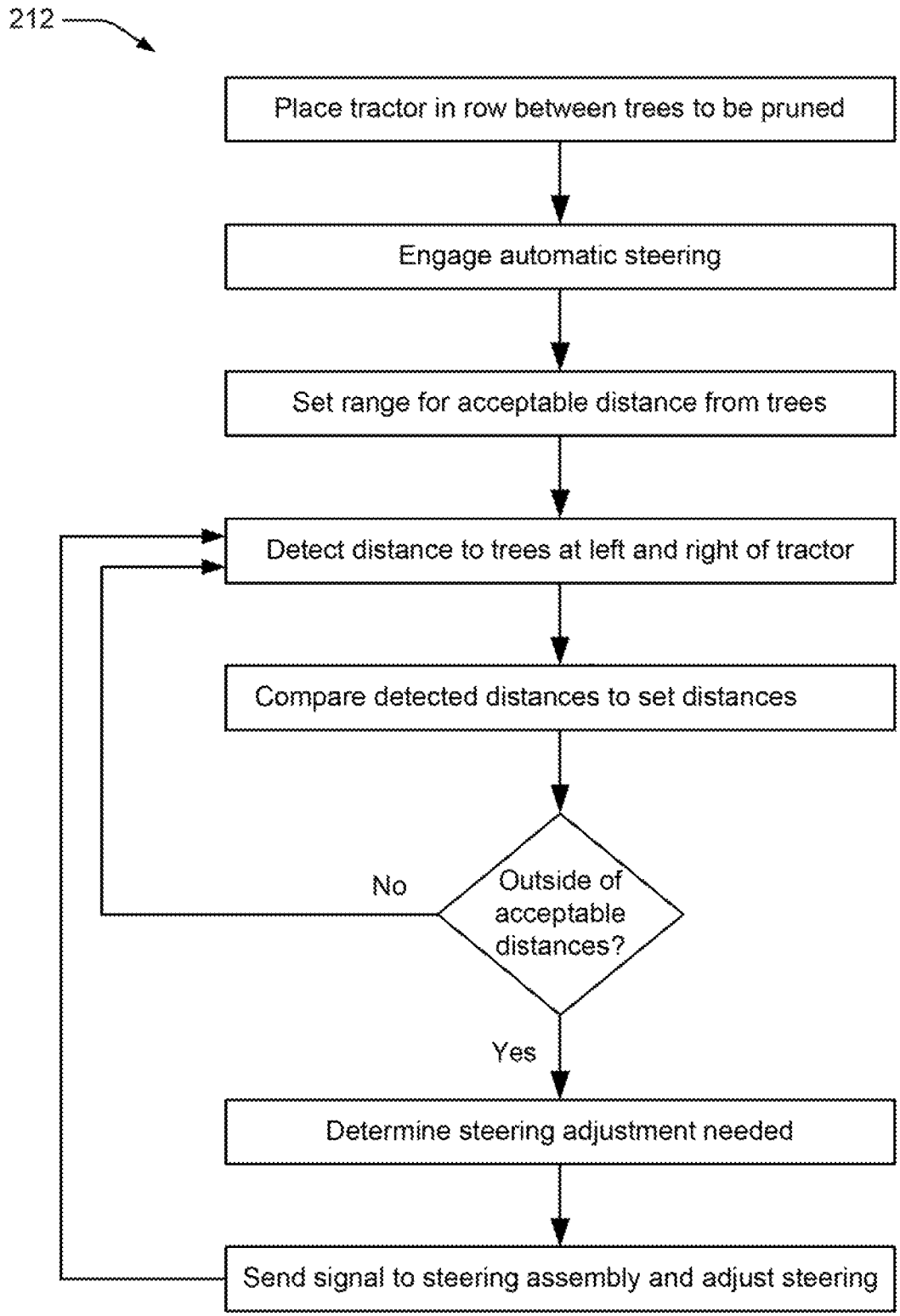
FIG. 6 is a flowchart of an automatic steering system of an embodiment of the present invention.

Alternatively, an automatic detection-based steering system 212, outlined in FIG. 6, may include a detection mechanism, such as a photoelectric eye or an ultrasound detector. Such detectors can determine a distance the tractor is from a row or rows of trees as the tractor travels between rows of trees. In this embodiment, automatic steering system 212 is set with a distance range that tractor 100 should maintain from a row of trees. When detector mechanism senses that tractor 100 has deviated from that range, i.e., either gotten too far or too close to a row of trees, a corrective steering operation is performed automatically. As platform 108 is laterally movable by the pruner, the ability of tractor 100 to maintain an approximate heading allows the pruner to focus on adjusting the platform instead of concerning themselves with adjusting the tractor position.

Automatic steering system 212 can include a first sensor and a second sensor attached to tractor 100 that transmit and receive ranging signals. The ranging signals can be directed toward a row of trees, a crop row, or a furrow on both sides of the tractor. The ranging signals strike the row, such as, in particular, the trunks of fruits trees along the row, or furrow and are reflected back toward the sensor. A processor can then combine and compare the ranging data in order to determine lateral displacement of the tractor with respect to the rows or the center of the rows. Any displacement or deviation is converted into corrective steering commands. The corrective steering commands are translated into motor operations for the motor that is operably connected to the steering wheel, which is thus adjusted to cause the tractor to be directed back toward the center of the rows.

A DC motor can be used to control the steering of tractor 100. When the automatic steering feature is engaged, control of steering is switched from control box 152 to the automatic steering system, which allows the GPS or detection system to steer wheel 164 based on feedback received (either via satellite data or sensors). When manual steering is required for any reason, control of tractor 100 can be switched back to control box 152 by a pruner on platform 108b. While various levels of precision are possible depending on the type and quality of system used, any automatic steering system used will preferably keep the tractor within about three feet or so of a desired course, which would allow workers to continue working because of the ability to adjust the horizontal position of platform 108.

Figure 7:
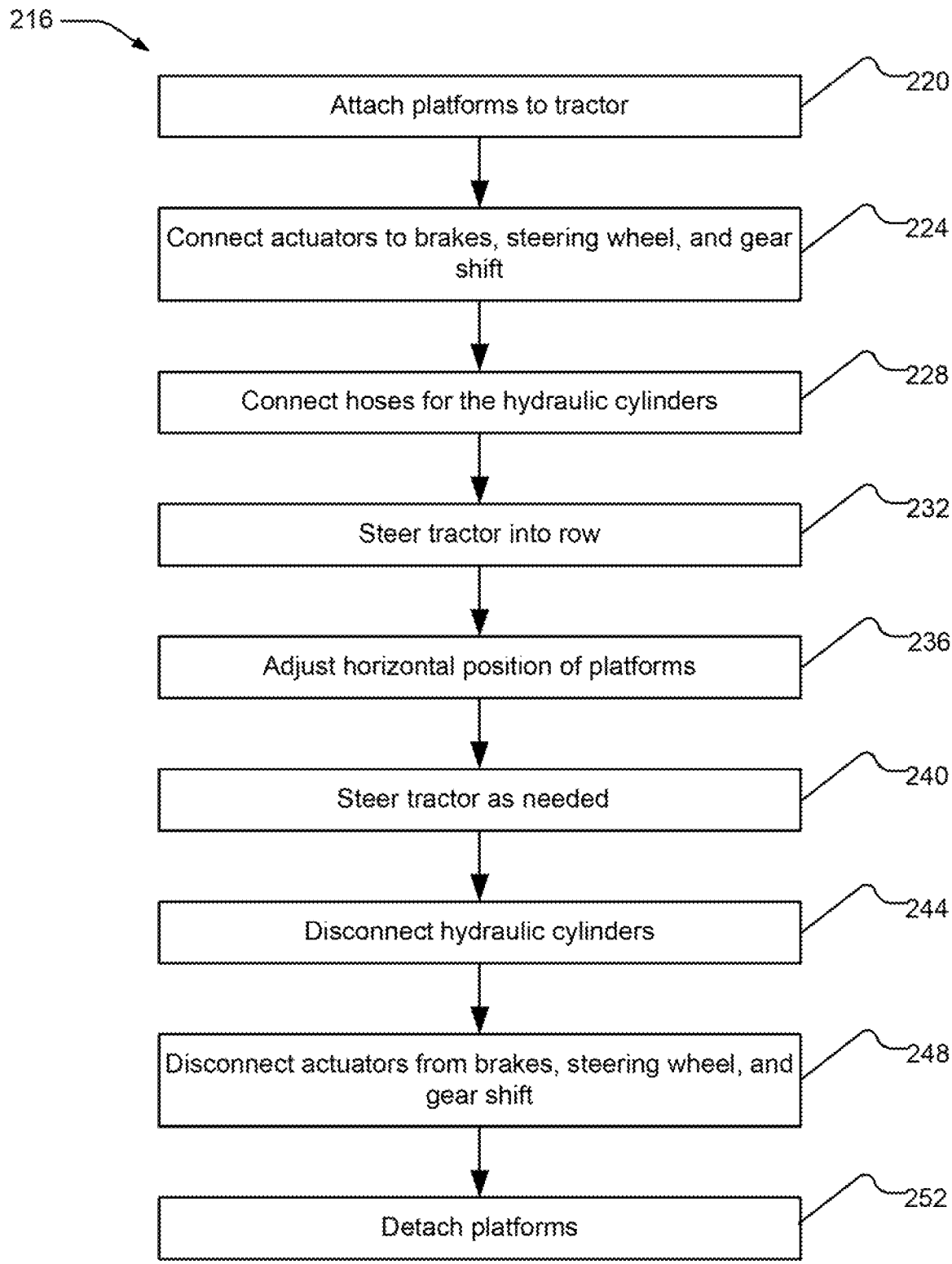
FIG. 7 is a flow chart of an exemplary attachment and detachment procedure for the working platforms of the present invention.

FIG. 7 is a flowchart 216 that outlines steps for using the working platforms with a utility tractor to work in an orchard or similar location. At step 220, the working platforms are attached to the utility tractor. Then, at step 224, actuators are connected to the brakes, the steering wheel, and the gear shift of the tractor. Next, hoses for the hydraulic cylinders are connected at step 228, at which point the tractor can be steered into a row of an orchard at step 232. Work can be performed on trees on either side of the row and adjustments are made to the horizontal positioning of the platforms at step 236 as needed for the work being performed. At the same time, the tractor may be steered by making adjustments at step 240, which may be either automatically executed or manually, or both. In this way, the platforms can be tracked along the curvilinear path of the orchard trees while the tractor continues down the row. When the working platforms are no longer needed, they can be removed by disconnecting the hydraulic cylinders at step 244 and disconnecting actuators from the brakes, the steering wheel, and the gear shift at step 248. The working platforms can then be detached from the tractor at step 252.

Figure 8:
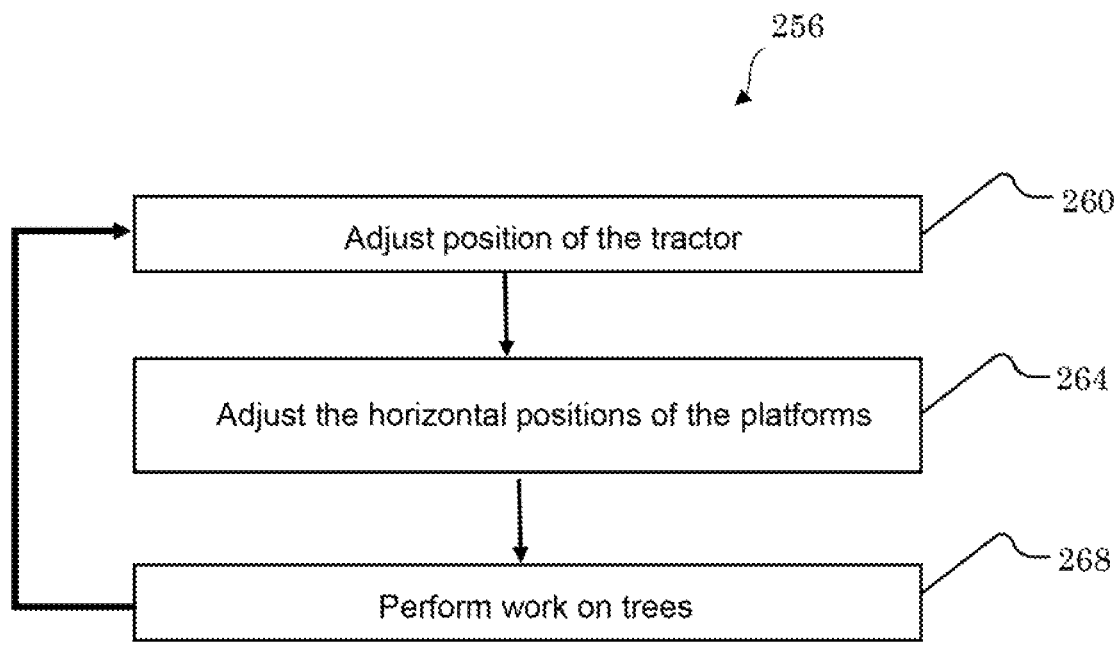
FIG. 8 is a flow chart of an exemplary procedure for operating a tractor with working platforms of the present invention.

In operation, a process 256 for pruning or harvesting fruit trees, for example, as outlined in FIG. 8, allows for increased efficiency of work performed on the trees. A tractor is initially positioned between rows of the trees that are to be worked on. Once between the rows, the location of the tractor along the rows is adjusted at step 260. Adjusting the location may be accomplished by manually driving the tractor, either from one of the working platforms via control systems described herein or from the standard tractor controls, or automatically via one of the systems described above, namely a GPS position control system or a sensor-based steering system. In a preferred embodiment, the tractor position is maintained in the center of the space between rows automatically while the tractor progresses continuously down the rows, i.e., the tractor moves slowly down the rows as work on the trees occurs. As the tractor moves slowly down the row (or, in an alternative embodiment, when the tractor is stopped proximate trees on either side of the row to be worked on), the horizontal positions of the working platforms are adjusted at step 264. This allows each platform to be located at an appropriate position with respect to the tree, or more specifically, to the branches of the tree, to be pruned or harvested; i.e., it is beneficial to adjust the horizontal positions of the platforms to comport with the curvilinear shape created by the plurality of branches of a tree. With the platforms in appropriate positions, work, such as pruning or harvesting, is performed on the trees at step 268. As that work is occurring, or after that work is completed, the position of the tractor is adjusted again at step 260 so that the tractor progresses down the row, at which point the horizontal positions of the platforms may need to be adjusted again based on the branches that are now in line with the platforms. This process 256 can thus continuously proceed until work on entire rows of trees is completed.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A device for supporting workers on a utility tractor that is configured to be removably attached to the utility tractor, comprising:
   a frame mount attached to a frame of the tractor;
   a plurality of first vertical supports attached to the frame mount on a first side of the tractor along a front half of the tractor;
   a plurality of second vertical supports attached to the frame mount on a second side of the tractor along the front half of the tractor, wherein the second side is opposite the first side;
   a first cross-bar member attached to the plurality of first vertical supports;
   a second cross-bar member attached to the plurality of second vertical supports;
   a first platform attached to the first cross-bar member via a first hingeable arm;
   a second platform attached to the second cross-bar member via a second hingeable arm, wherein the second platform is adjustable horizontally toward and away from the second side of the tractor independently from the first platform by an operator on the second platform; and
   a control mechanism on the first platform operably connected to steering, braking and gear shifting functions of the tractor, wherein the control mechanism includes a motor, a wheel, and a band, wherein the band is operably wrapped around the wheel and a steering wheel of the tractor, and wherein the motor turns the wheel such that the steering wheel is controlled through control of the motor, wherein the first platform is adjustable horizontally toward and away from the first side of the tractor independently from the second platform by a user on the first platform.

2. The device of claim 1, wherein the control mechanism includes a gear shift assembly, the gear shift assembly including a knob for changing gears that is operably connected to an actuator that is reversibly attached to a gear shift lever of the tractor.

3. A working platform comprising:
a frame mount designed and configured to be removably attached to a frame of a tractor;
a plurality of vertical supports attached to the frame mount;
a cross-bar member attached to the plurality of vertical supports;
a decking connected to the cross-bar member via a hingeable arm, wherein the decking includes a safety rail system and wherein the decking is configured to be adjusted horizontally by a hydraulic cylinder attached to the cross-bar member and configured to pivot the hingeable arm in response to a foot pedal control; and a control mechanism on the working platform designed and configured to be operably connected to steering, braking and gear shifting functions of the tractor, wherein the control mechanism includes a motor, a wheel, and a band, wherein the band is operably wrapped around the wheel and a steering wheel of the tractor, and wherein the motor turns the wheel such that the steering wheel is controlled through control of the motor.

4. The working platform of claim 3, wherein the control mechanism includes a gear shift assembly; the gear shift assembly including a knob for changing gears that is operably connected to an actuator that is reversibly attached to a gear shift lever of the tractor.

* * * * *